(12) United States Patent
Satou

(10) Patent No.: US 8,340,732 B2
(45) Date of Patent: Dec. 25, 2012

(54) MOBILE ELECTRONIC DEVICE

(75) Inventor: Akira Satou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 204 days.

(21) Appl. No.: 13/014,944

(22) Filed: Jan. 27, 2011

(65) Prior Publication Data

US 2011/0183729 A1    Jul. 28, 2011

(30) Foreign Application Priority Data

Jan. 27, 2010   (JP) .................................. 2010-016032

(51) Int. Cl.
*H04M 1/00* (2006.01)
(52) U.S. Cl. .................. 455/575.1; 455/333; 455/550.1; 379/433.01
(58) Field of Classification Search .................. 455/333, 455/550.1, 575.1; 379/433.01
See application file for complete search history.

(56) References Cited

U.S. PATENT DOCUMENTS

| | | | | |
|---|---|---|---|---|
| 4,471,493 A * | 9/1984 | Schober | ...................... | 455/575.7 |
| 5,640,459 A * | 6/1997 | Hedeen | ........................... | 381/75 |
| 6,463,263 B1 * | 10/2002 | Feilner et al. | ................. | 455/90.1 |
| 7,738,656 B2 * | 6/2010 | Yoda | ......................... | 379/433.01 |
| 2010/0009730 A1 * | 1/2010 | Hashizume | ................ | 455/575.7 |

FOREIGN PATENT DOCUMENTS

| | | |
|---|---|---|
| JP | 2003-273621 (A) | 9/2003 |
| JP | 2006-139100 (A) | 6/2006 |
| JP | 2007-274689 (A) | 10/2007 |

* cited by examiner

*Primary Examiner* — Nhan Le

(57) ABSTRACT

A mobile electronic device is disclosed. A housing comprises a circuit board located inside the housing. Protection means protects an electronic component located on the circuit board and exposed externally through an external opening in the housing.

9 Claims, 8 Drawing Sheets

MOBILE ELECTRONIC DEVICE

CROSS-REFERENCE TO RELATED APPLICATION

The present application claims priority under 35 U.S.C. §119 to Japanese Patent Application No. 2010-016032, filed on Jan. 27, 2010, entitled "MOBILE ELECTRONIC DEVICE". The content of which is incorporated by reference herein in its entirety.

FIELD

Embodiments of the present disclosure relate generally to mobile electronic devices, and more particularly relate to a mobile comprising an electronic component.

BACKGROUND

A conventional mobile electronic device such as a mobile phone may comprise a housing and a circuit board housed inside the housing. When an electronic component is exposed externally, static electricity may enter the electronic component; hence, there is a possibility that the electronic component will be adversely affected.

SUMMARY

A mobile electronic device from static electricity is disclosed.

In an embodiment, a mobile electronic device comprises a housing, a circuit board, a first electronic component, and a reference potential section, an opening is formed in the housing. The circuit board is located inside the housing and on which electronic components are mounted. The first electronic component is mounted on the circuit board and is exposed to the outside of the housing via the opening. The reference potential section is located inside the housing and is electronically connected to the reference potential. With regard to the housing, the opening is formed, and at the same time, a partition section to partition said the electronic component and the reference potential section is formed. The housing comprises a partition section forming the opening and partitioning the first electronic component and the reference potential section. The partition section comprises a through-hole penetrating the side on which the first electronic component is located and the side on which the reference potential section is located. The impedance between the outer edge region in which the through-hole of the partition section is formed and the reference potential section is lower than the impedance between the outer edge region in which the through-hole of the partition section is formed and said the electronic component.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phone, and the techniques described herein may also be utilized in other applications. For example, embodiments may be applicable to, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
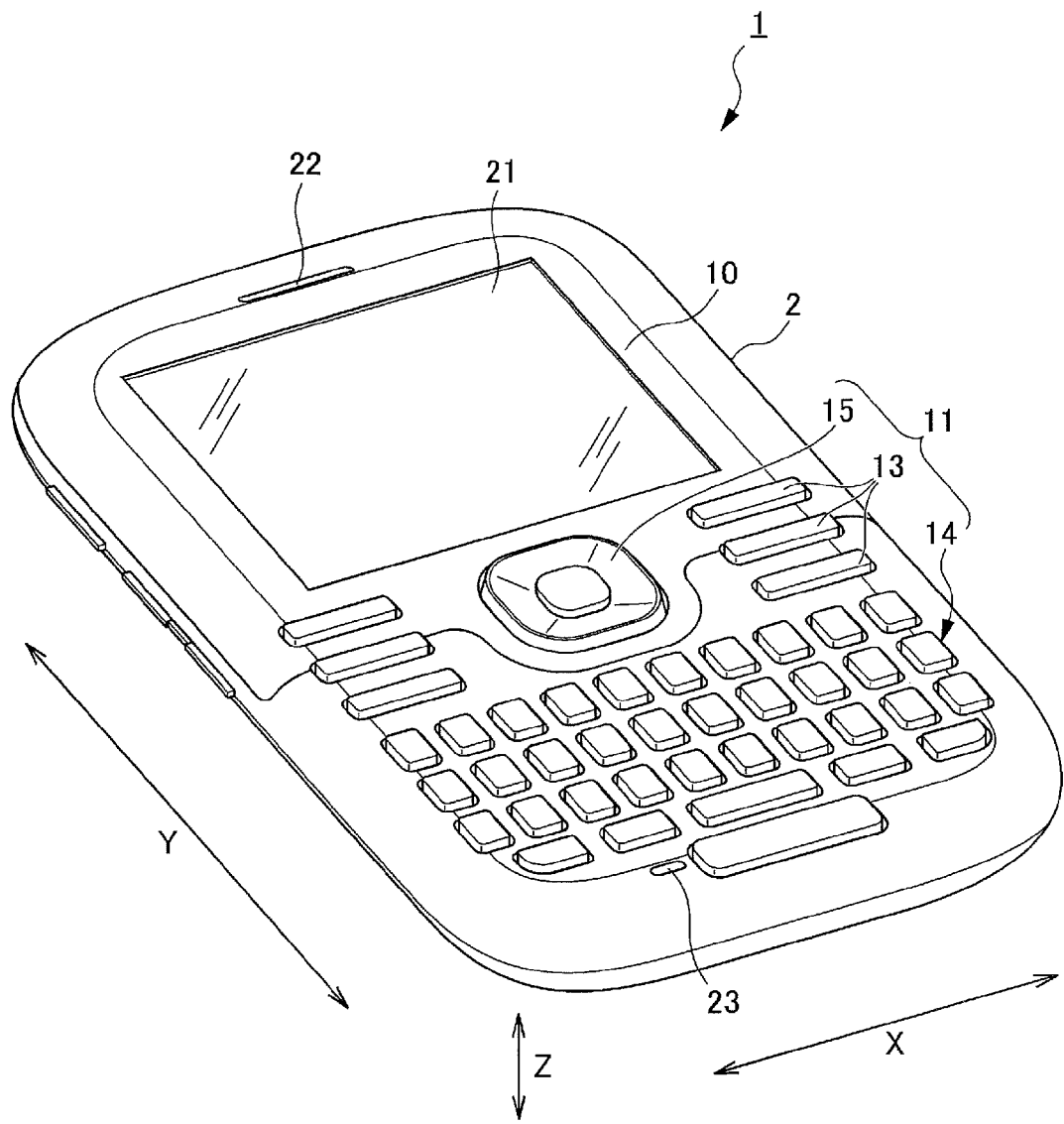
FIG. 1 is an illustration of a perspective view of an electronic mobile device showing a front side thereof according to an embodiment of the disclosure.
Figure 2:
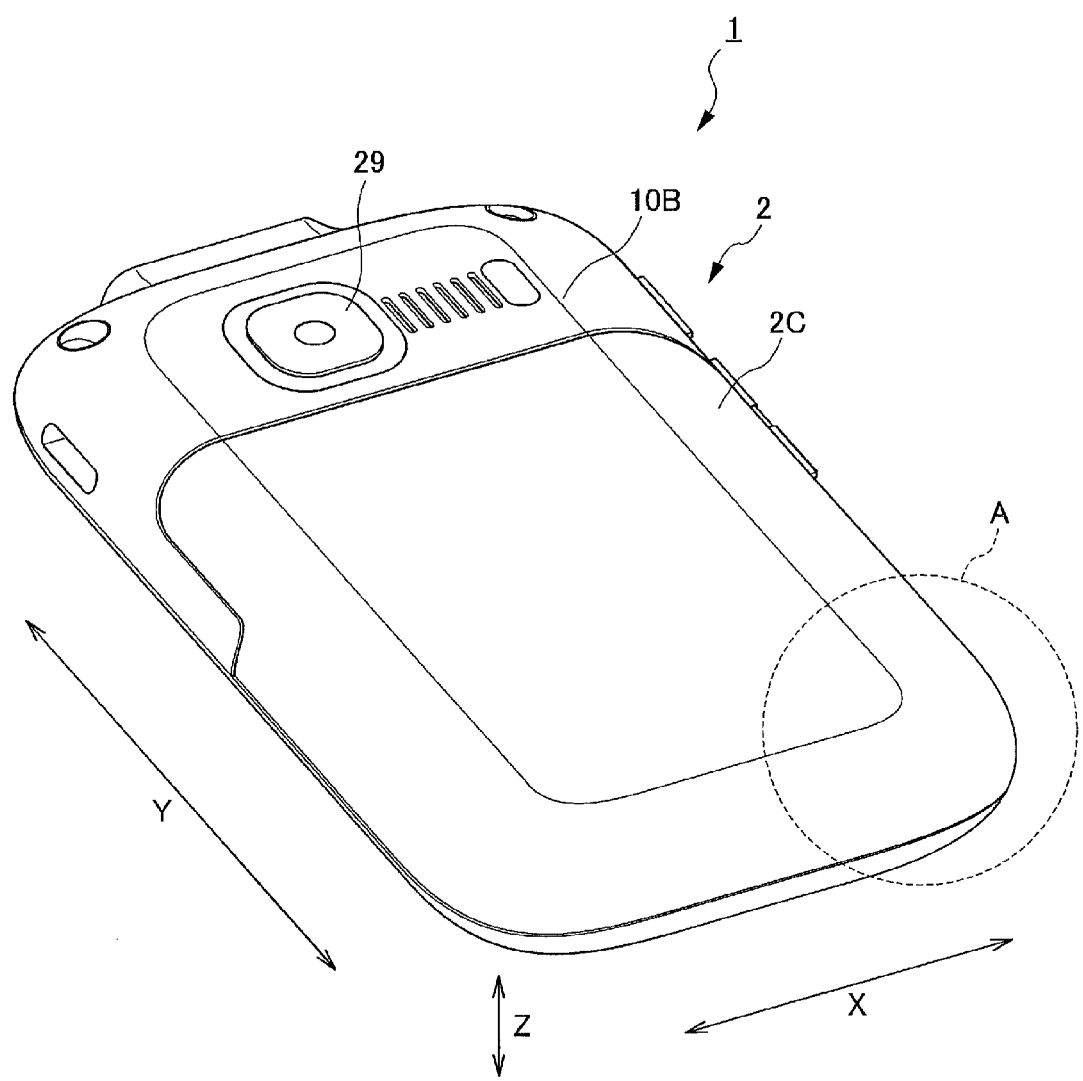
FIG. 2 is an illustration of a perspective view of an electronic mobile device showing a rear side thereof according to an embodiment of the disclosure.

Below, a preferred embodiment of the present invention is explained with reference to the figures. First, FIG. 1 and FIG. 2 explain the basic configuration of the mobile phone 1 as a mobile electronic device. FIG. 1 is a perspective view for explaining the front side of the mobile phone 1. FIG. 2 is a perspective view for explaining the rear side of the mobile phone 1.

As shown in FIG. 1 and FIG. 2, the mobile phone 1 comprises a housing 2.

As shown in FIG. 1, the mobile phone 1 comprises an operation section 11 that is located on the front side 10A of the housing 2 (key operation section), a display section 21, a speaker 22, and a microphone 23.

The operation section 11 comprises a plurality of keys. The operation section 11 comprises a function setting operation key 13 for operating various functions such as various setting functions, a dictionary function, or e-mail function, an input operation key 14 for entering numbers and characters, and a decision operation key 15 that makes a decision for various operations and that performs scrolling, etc. The key group comprising the operation section 11 is located toward one side of the housing 2 in the longitudinal direction Y. The operation section 11 detects various inputs.

The display section 21 is, for example, a liquid-crystal display, or an EL (electroluminescence) display, etc. The display section 21 is located toward another end of the housing 2 in the longitudinal direction Y. The display section 21 is located side-by-side with the key group comprising the operation section 11 in the longitudinal direction Y.

The display section 21 displays various types of information (character information and image information) such as the telephone number, e-mail address of a receiver, and e-mail contents.

The speaker 22 is located in the vicinity of one end of the housing 2 in the longer direction Y. The speaker 22 outputs the voice of the receiver.

The microphone 23 is located in the vicinity of another end of the housing 2 in the longitudinal direction Y. The microphone 23 is used in order to input the voice that a user of the mobile phone 1 emits during a call.

As shown in FIG. 2, the mobile phone 1 comprises a camera section 29 located on the rear side 10B of the housing 2.

The camera section 29 is located on one end of the housing 2 in the longitudinal direction Y. The camera section 29 is located so as to be superimposed with the speaker 22 in the thickness direction Z of the housing. The camera section 29 images a photographic object set by a user.

On the rear side 10B of the housing 2, a battery lid 2c, which is explained subsequently, is attached detachably.

Figure 3:
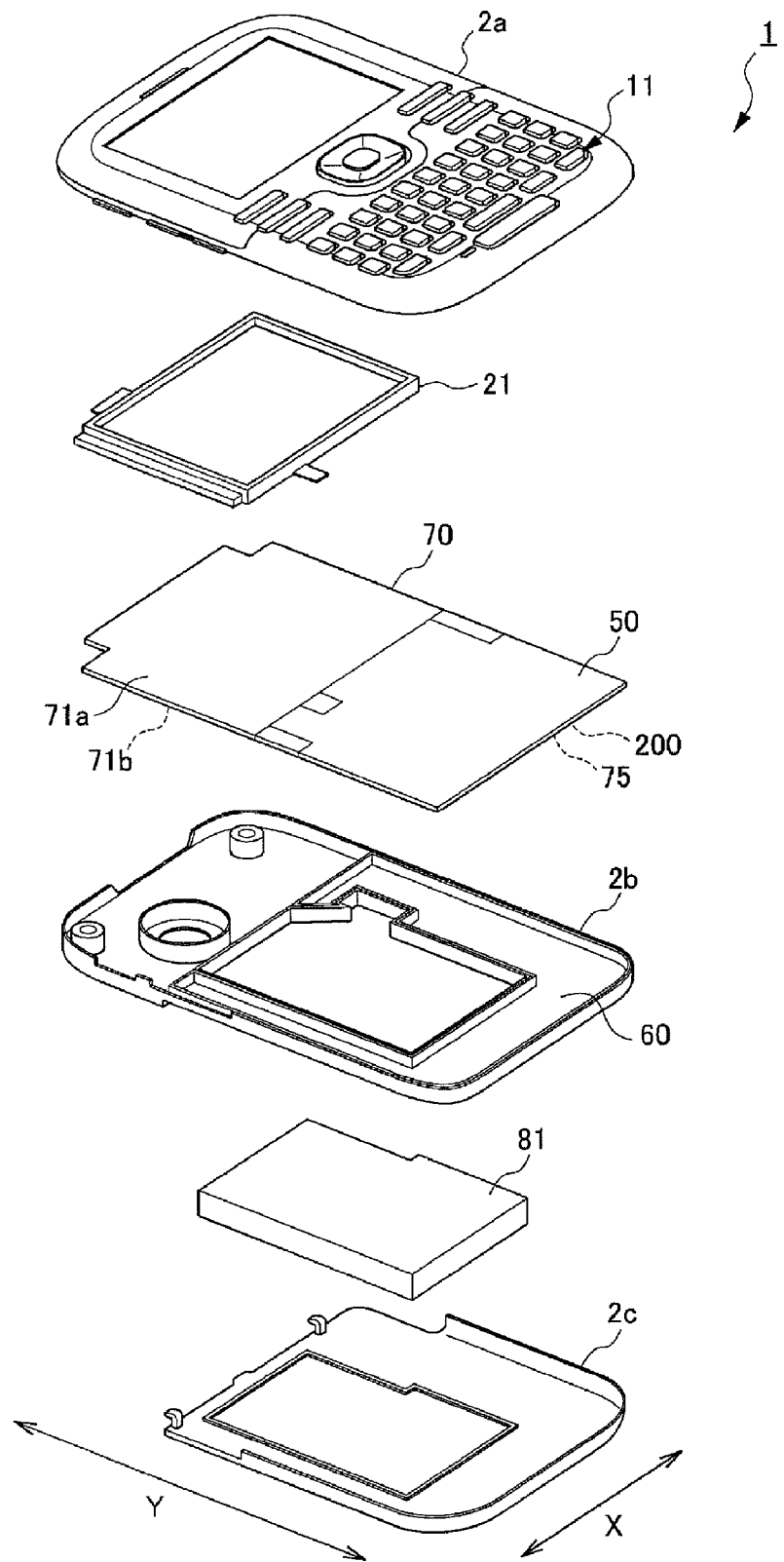
FIG. 3 is an illustration of an exploded perspective view an electronic mobile device according to an embodiment of the disclosure.

Next, in FIG. 3, the internal configuration of the mobile phone 1 is explained. FIG. 3 is an exploded perspective view of the mobile phone 1.

As shown in FIG. 3, the housing 2 comprises a front case 2a, a key structure section, which is not shown in the figures, a key substrate 50, a shield case 60, a circuit board 70, an antenna section, which is not shown in the figures, a rear case 2b, a battery 81, and a battery lid 2c.

As shown in FIG. 3, the housing 2 comprises, as a case member constituting an outline, the front case 2a, the rear case 2b, and the battery lid 2c.

The front case 2a and the rear case 2b are located such that the respective hollow inner sides face each other and are combined such that the respective outer edges overlap.

Moreover, on the outer surface (the rear side 10B) of the rear case 2b, the battery lid 2c is attached to the rear case 2b detachably.

On the rear case 2b, in a state in which the battery lid 2c is removed, an opening section 100 that is exposed externally, a wall section 300, and a through-hole 310 are formed (refer to FIG. 3 to FIG. 6). These are explained subsequently.

As shown in FIG. 3, inside the housing 2, a key structure section, which is not shown in the figures, the key substrate 50, the shield case 60, the circuit board 70, the antenna section, which is not shown in the figures, and the battery 81 are located.

In the present embodiment, the key substrate 50 is stacked and located toward the side of the first surface 70a, which is one end of the circuit board 40 in the longitudinal direction Y.

Moreover, the shield case 60 is located integrally so as to fit the rear case 2b.

Next, each component is explained.

The key structure section comprises an operation member (key top), a key frame as a reinforced member, and a key sheet as a sheet member.

The key substrate 50 comprises a plurality of key switches. The plurality of key switches are located at the position corresponding to the operation member, respectively. The key switches located on the key substrate 50 are configured so as to comprise a metal dome, which is a metal plate formed three-dimensionally by curving in a bow-shape.

The shield case 60 is a conductive member. The shield case 60 comprises a plate section and a rib. The rib is formed so as to abut a reference potential pattern layer 75, which is described subsequently, in the state in which the shield case 60 is placed on the circuit board 70. The shield case 60 inhibits noise such as the high frequency waves emitted from the outside, etc., from acting on various electronic components located on the circuit board 70, and shields the noise emitted from the RF (radio frequency) circuit, CPU circuit, power circuit, etc., formed on the circuit board 70.

On the circuit board 70, various electronic components are mounted, and the RF (radio frequency) circuit, CPU circuit, power circuit, etc., are formed.

On the second surface 70b (mounting side) of the circuit board 70, an RF connector 200 (terminal) as the first electronic component, an electronic component 210 as the second electronic component, an electronic component 220 as the third electronic component, etc., which are described subsequently, are mounted. Moreover, on the second surface 70b (mounting side) of the circuit board 70, the reference potential pattern layer 75 is formed. The reference potential pattern layer 75 is formed, for example, by printing the conductive members on the surface of the second surface 70b of the circuit board 70.

The antenna section comprises an antenna element arranged in a predefined shape on the base. The antenna element of the antenna is formed by a belt-shaped metal plate. Moreover, the antenna is fed from the circuit board 70 via a feed terminal, which is not shown in the figures.

Next, by referring to FIG. 4 to FIG. 8, the static control configuration in the region A comprising the RF connector 200 as the first electronic component mounted on the second surface 70b (mounting side) of the circuit board 70 is explained.

Figure 4:
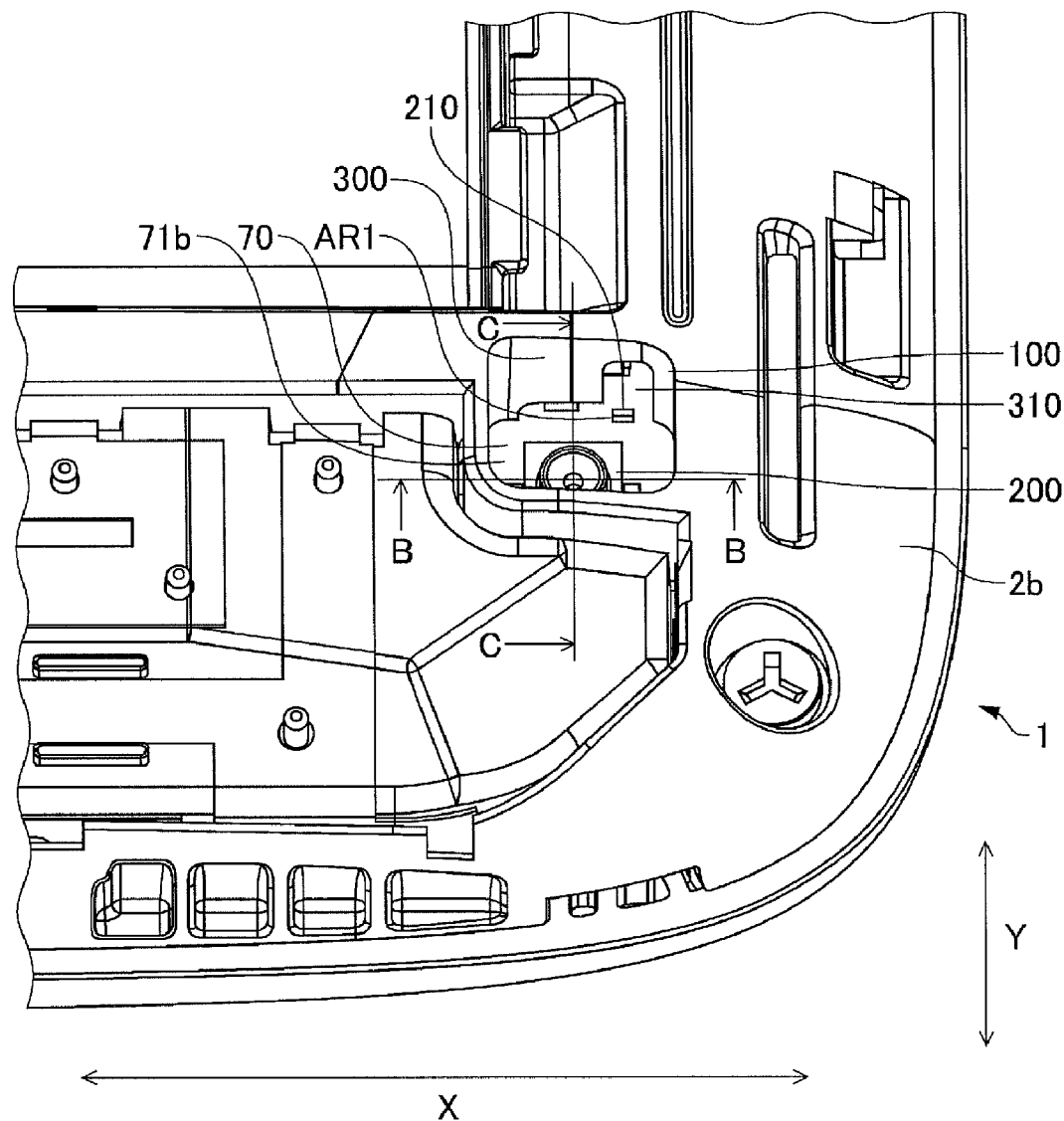
FIG. 4 is an illustration of a partially enlarged view of a region A from FIG. 2 in which a cover is removed according to an embodiment of the disclosure.
Figure 5:
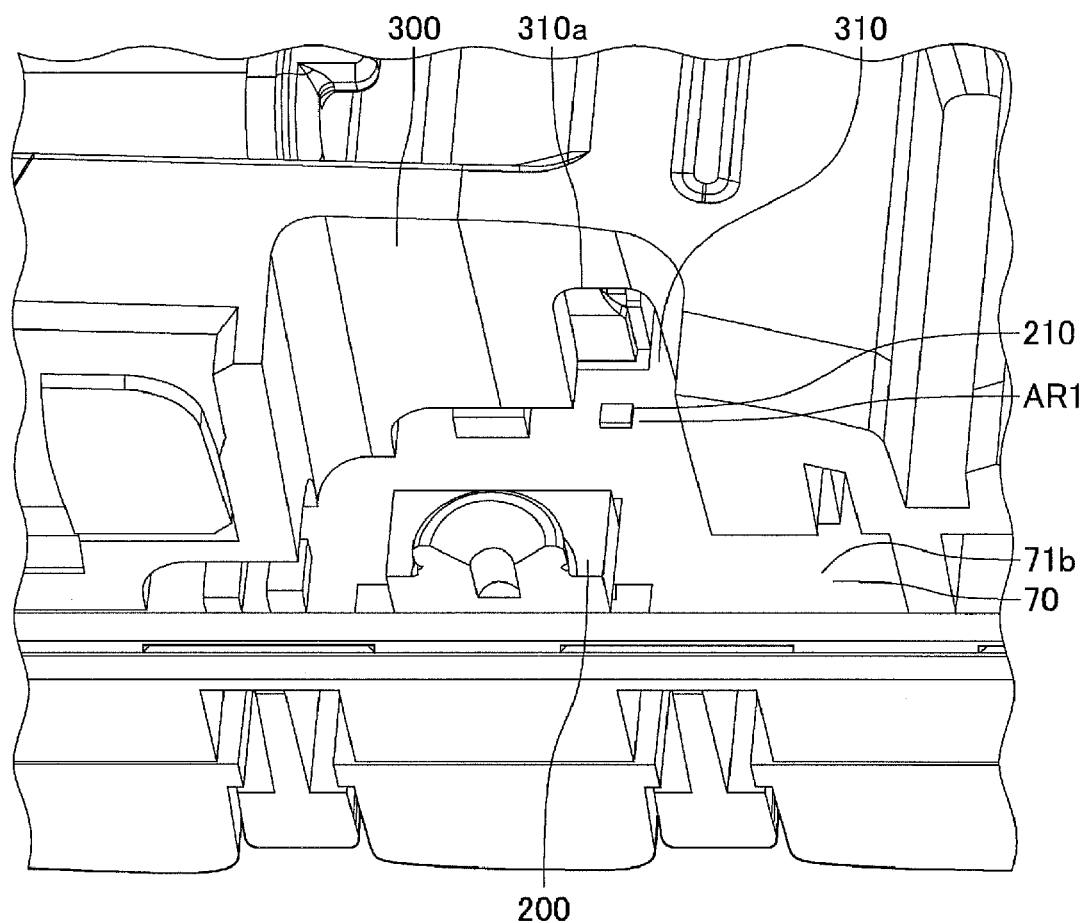
FIG. 5 is an illustration of a cross-sectional view along a line B-B of FIG. 3.
Figure 6:
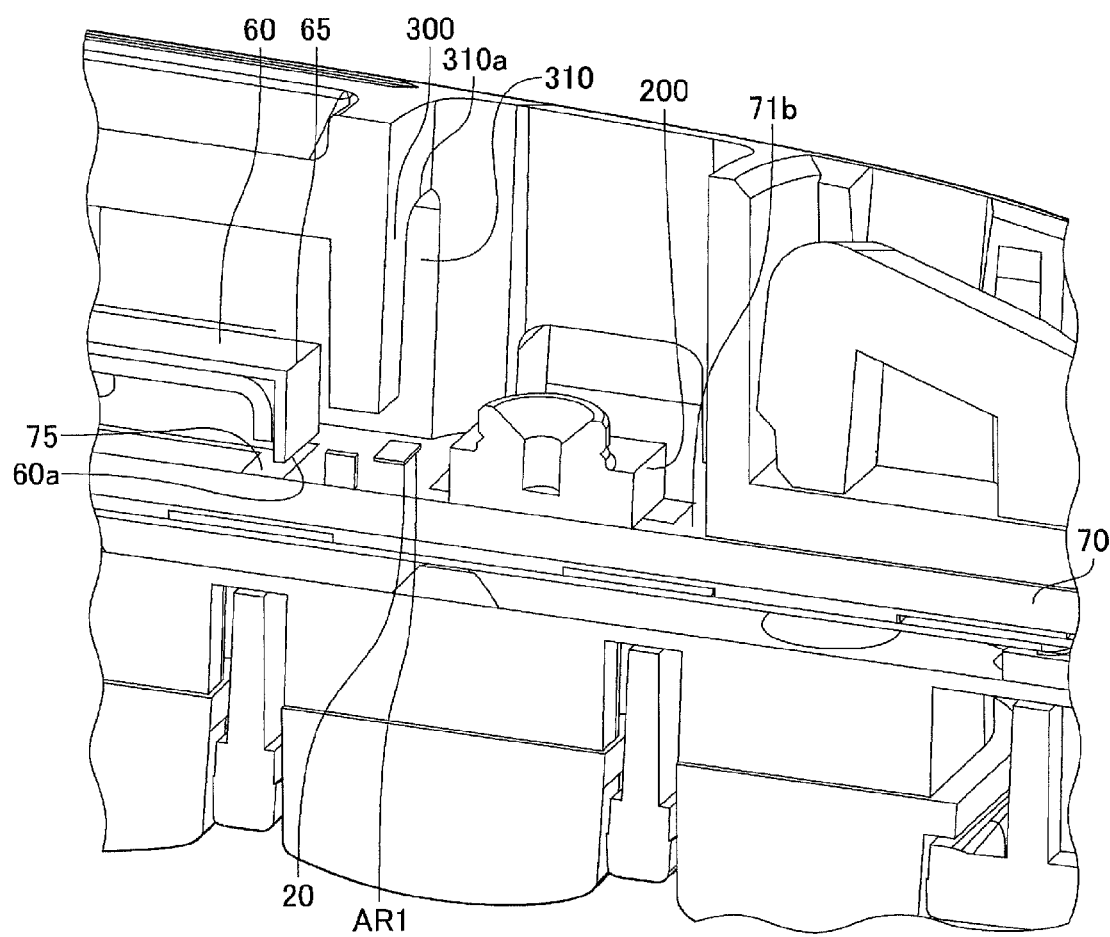
FIG. 6 is an illustration of cross-sectional view along a line C-C of FIG. 3 according to an embodiment of the disclosure.
Figure 7:
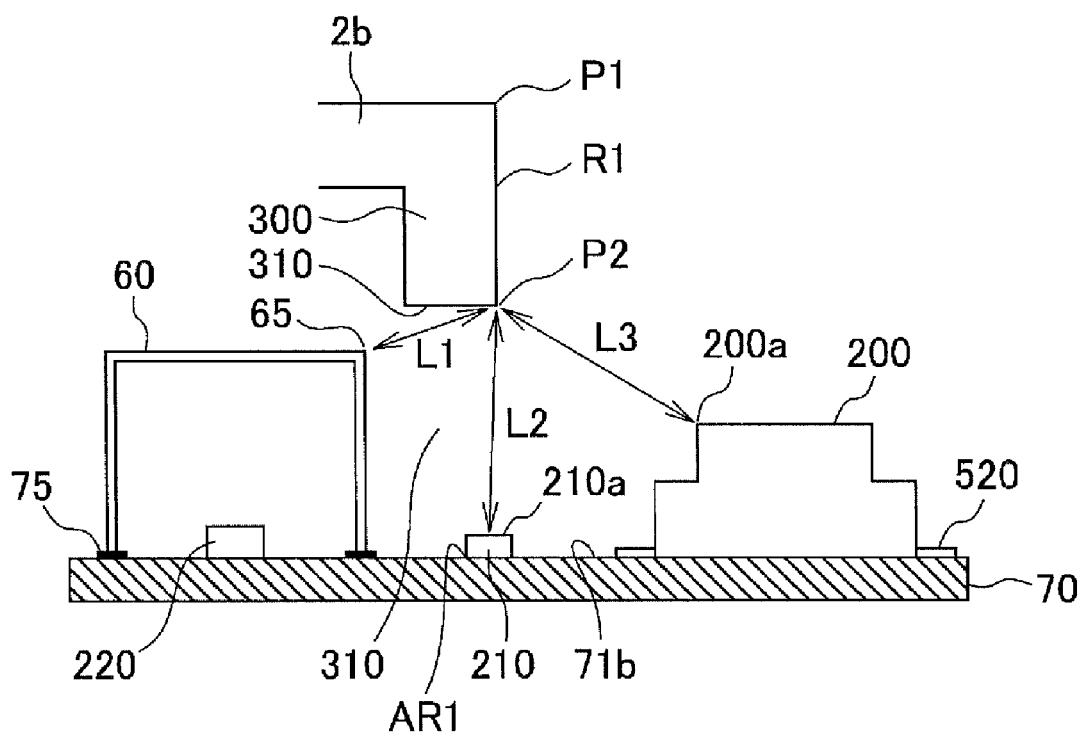
FIG. 7 is an illustration of an electronic mobile device showing distance relationship between respective components thereof according to an embodiment of the disclosure.
Figure 8:
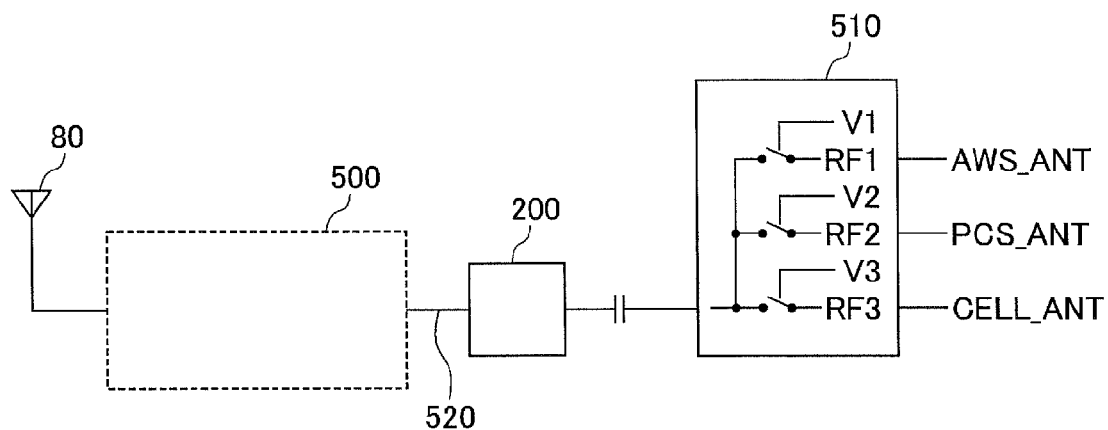
FIG. 8 is an illustration of a circuit diagram according to an embodiment of the disclosure.

FIG. 4 is a partially enlarged view of the region A from FIG. 2 in the state in which the cover member is removed. FIG. 5 is a B-B cross-sectional view of FIG. 3. FIG. 6 is a C-C cross-sectional view of FIG. 3. FIG. 7 is a schematic diagram explaining the distance relationship between the respective components themselves. FIG. 8 is a circuit diagram explaining the circuit in which the RF connector is connected.

As shown in FIG. 4 to FIG. 6, on the rear case 2b, the opening section 100 that is exposed externally in the state in which the battery lid 2c is removed is formed. The opening section 100 is formed by penetrating from one side of the rear case 2b to the other side. The opening section 100 is formed so as to externally expose the RF connector 200 (terminal) as the first electronic component that is mounted on the circuit board 70, in the state in which the battery lid 2c is removed.

As shown in FIG. 4 to FIG. 6, the RF connector 200 as the first electronic component is mounted on the second surface 70b (mounting side) of the circuit board 70. The RF connector 200 exposes externally via the opening section 100 in a state in which the battery lid 2c is removed.

The RF connector 200 is mounted on the second surface 70b (mounting side) of the circuit board 70 such that the side surface is surrounded by the wall section 300 as a partition section, which is described subsequently, formed continuously at the outer edge of the opening section 100 so as to extend to the circuit board 70 side. In other words, the RF connector 200 is surrounded by the second surface 70b of the circuit board 70 and the wall section 300.

As shown in FIG. 4 to FIG. 6, the wall section 300 as the partition section forms the opening section 100 and is located so as to partition the RF connector 200 and the shield case 60.

The wall section 300 is formed continuously at the outer edge of the opening section 100.so as to extend to the circuit board 70 side The wall 300 is located so as to surround the side surface of the RF connector 200.

Moreover, the wall section 300 is formed so as to partition the RF connector 200 and the shield case 60, which is described subsequently.

On the wall section 300, the through-hole 310 is formed.

As shown in FIG. 6, on the second surface 71b (mounting side) of the circuit board 70, the shield case 60 is mounted as the reference potential section. Specifically, the shield case 60 is mounted on the second surface 71b (mounting side) of the circuit board 70 in the state in which the bottom surface 60a abuts on the reference potential pattern layer 75 formed on the circuit board 70. In the present embodiment, the shield case 60 is used as a member to transmit static electricity from the outside.

The shield case 60 comprises a sharp end section 65 formed to be sharp so as to project toward the region in which the through-hole 310 of the wall section 300 is formed (including the outer edge region of the through-hole 310 and an inner side 310a which is described later). In the present embodiment, the sharp end section 65 is preferable because it easily transmits static electricity.

The shield case 60, as the original function, shields the electronic component 220 (refer to FIG. 7) as the third electronic component. Specifically, the shield case 60 is disposed so as to surround the electronic component 220 as the third electronic component, and shields the electronic component 220 as the third electronic component that is surrounded by the shield case 60 from high frequency wave noise, etc.

The through-hole 310 is formed on the wall section 300.

The through-hole 310 is formed by penetrating the side on which the RF connector 200 is located on the wall section 300 and the side on which the shield case 60 is located.

The through-hole 310 is formed at the end section of the second surface 70b in the wall section 300. In other words, the through-hole 310 is formed so as to extend to the side on which the battery lid 2c is located from the second surface 70b.

The through-hole 310 is formed by penetrating the region facing the RF connector 200, specifically the side on which the RF connector 200 is located on the wall section 300 and the region facing the shield case 60, specifically the side on which the shield case 60 is located. In other words, the through-hole 310 is formed in the area that is sandwiched between the RF connector 200 and the shield case 60.

On a region AR1 facing the inner side 310a of the through-hole 310 on the second surface 70b of the circuit board 70, the electronic component 210 as the second electronic component is mounted.

The region AR1 is the region that becomes possible to mount the electronic component by comprising the through-hole 310 formed. That is, the region AR1 is the mountable region which has become wide to mount the electronic components by comprising the through-hole 310 formed.

The electronic component 210 as the second electronic component is mounted on the region AR1. That is, the electronic component 210 is the electronic component that can be mounted by comprising the through-hole 310 formed.

Next, by referring to FIG. 7, the distance relationship between the respective elements is described.

As shown in FIG. 7, on a presumed route R1 where the static electricity enters from an entry section P1 flows, the distance between an outer edge region P2 which is located closest to the respective element and the respective element is as follows. The outer edge region P2 is part of the outer region (including the outer edge of the through-hole 310 and the inner side 310a) in which the through-hole 310 of the wall section 300 is formed.

A distance L1 between the outer edge region P2 and the sharp end section 65 of the shield case 60 is shorter than a distance L3 between the outer edge region P2 and a predefined section 200a (the area closest to the P2) of the RF connector (L1<L3). That is, the impedance between the outer edge region P2 and the sharp end section 65 of the shield case 60 is lower than the impedance between the outer edge region P2 and the predefined section 200a of the RF connector.

Accordingly, when the static electricity is transmitted to the outer edge region P2, the static electricity is transmitted to the shield case 60 that is electronically connected to the reference potential pattern layer 75.

The distance L1 between the outer edge region P2 and the sharp end section 65 of the shield case 60 is shorter than a distance L2 between the outer edge region P2 and an upper surface 210a (the area closest to the P2) of the electronic component 210 as the second electronic component (L1<L2). That is, the impedance between the outer edge region P2 and the sharp end section 65 of the shield case 60 is lower than the impedance between the outer edge region P2 and the upper surface 210a of the electronic component 210 as the second electronic component.

Accordingly, when static electricity is transmitted to the outer edge region P2, the static electricity is transmitted to the shield case 60 that is electronically connected to the reference potential pattern layer 75.

Next, by referring to FIG. 8, the circuit to which the RF connector 200 is connected is explained.

As shown in FIG. 8, the RF connector 200 is connected on a transmission line 520 that connects an antenna 80 and an adjustment circuit 500, and an antenna switching control circuit 510. In other words, the RF connector 200 is connected to the transmission line 520 through which the high frequency waves signals that are transmitted via the antenna 80 are transmitted.

When static electricity enters the RF connector 200 from the outside, the static electricity enters the antenna switching control circuit 510 through the transmission line 520. In this case, there is a possibility that a switch element constituting the antenna switching control circuit 510, etc., is destroyed.

In the present embodiment, the above configuration, inhibits the static electricity from entering the RF connector 200 and inhibits malfunctions of the antenna switching control circuit 510.

Based on the present embodiment, with regard to the mobile phone 1, the static electricity control for the electronic components such as the RF connector is strengthened. Accordingly, adverse effects are reduced on the electronic component or on the various configurations connected to this.

Moreover, according to the present embodiment, with regard to the mobile phone 1, without adding new components, etc., the static electricity control for the electronic components such as the RF connector is strengthened.

Moreover, according to the present embodiment, based on the simple configuration, the static electricity control is strengthened for the electronic components such as the RF connector.

Moreover, according to the present embodiment, the mobile phone 1 creates a region on which the electronic components, etc., can be newly mounted by forming the through-hole 310. That is, the mobile phone 1 can broaden the mounting area in the circuit board 70.

The present invention is not limited to the above embodiment and may be implemented in various forms. For example, in the present embodiment, although the mobile phone 1 is explained as a mobile electronic device, it is not limited to this, and it may be a PHS (registered trademark; Personal Handy phone System), a PDA (Personal Digital Assistant), a portable navigation device, a notebook, etc.

A straight type mobile phone 1 is described above as an example embodiment. In the straight type, the housing on the operation section side and the housing on the display section side are located as one housing without having a connection section (straight type). The mobile phone 1 may be also be, for example but without limitation, a foldable type at a connection section 4, a slide type in which in the state in which the housing on the operation section side and the housing on the display section side are overlapped, one side of the housing is slid in one direction, a turn type in which centering on an axis line along the direction of the superposition of the housing on the operation section side and the housing on the display section side, one side of the housing is rotated, and a 2-axis hinge type in which it can be opened and closed, and rotated.

Moreover, in the present embodiment, although the relationship of the respective distance themselves (L1, L2, L3) between the outer edge region P2 and the respective elements is defined, it is not necessary for the respective distance themselves to have the relationship described above, and so long as the respective impedances themselves between the outer edge region P2 and the respective elements meet the relationship described above, the mobile phone provides the effects described above.

Moreover, in the present embodiment, although the case in which the electronic component 210 (the second electronic component) is mounted on the region AR1 facing the inner side 310*a* of the through-hole 310 is described, it is not limited to this, and the electronic components need not be mounted on the region AR1.

Figure 9:
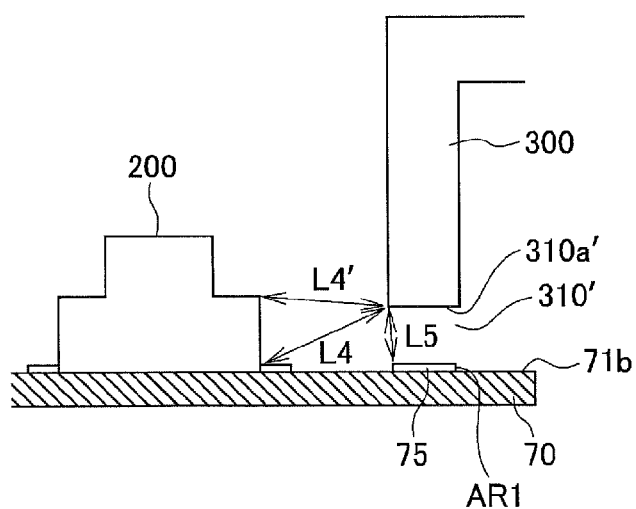
FIG. 9 is an illustration of a graph showing a reference potential pattern layer according to an embodiment of the disclosure.

For example, as shown in FIG. 9, the reference potential pattern layer 75 may be located on the region AR1 facing the inner side 310*a*' of the through-hole 310'. In this case, the length (height) from the second surface 71*b* to the through-hole 310' is shorter than the length (height) from the second surface 71*b* to the through-hole 310' in the embodiment described above. That is, the inner side 310*a*' of the through-hole 310' can be located close to the reference potential pattern layer 75 (L5<L4, L4'). Accordingly, the mobile phone 1 providing the effects similar to the effects in the embodiment described above can be provided.

The invention claimed is:

1. A mobile electronic device comprising:
    a housing in which an opening is formed;
    a circuit board located inside said housing and on which electronic components are mounted;
    a first electronic component mounted on said circuit board and exposed to the outside of said housing via said opening; and
    a reference potential section located inside said housing and electronically connected to the reference potential,
    wherein said housing comprises a partition section forming said opening and partitioning said first electronic component and said reference potential section;
    wherein said partition section comprises a through-hole penetrating the side on which said first electronic component is located and the side on which said reference potential section is located; and
    wherein the impedance between the outer edge region in which the through-hole of said partition section is formed and said reference potential section is lower than the impedance between the outer edge region in which the through-hole of said partition section is formed and said first electronic component.

2. The mobile electronic device according to claim 1 wherein
    the distance between the outer edge region in which the through-hole in said partition section is formed and said reference potential section is shorter than the distance between the outer edge region in which the through-hole in said partition section is formed and said first electronic component.

3. The mobile electronic device according to claim 1 wherein
    said first electronic component is surrounded by the mounting side on which said first electronic component of said circuit board is mounted and by said partition section,
    said through-hole is formed on an end section of the side on which said first electronic component of said circuit board in said partition section is mounted,
    on said circuit board, a second electronic component is located in the region facing the inner surface of said through-hole in said mounting side of said circuit board.

4. The mobile electronic device according to claim 3 wherein
    the impedance between the outer edge region in which the through-hole of said partition section is formed and said reference potential section is lower than the impedance between the outer edge region in which the through-hole of said partition section is formed and said second electronic component.

5. The mobile electronic device according to claim 4 wherein
    the distance between the outer edge region in which the through-hole of said partition section is formed and said reference potential section is shorter than the distance between the outer edge region in which the through-hole of said partition section is formed and said second electronic component.

6. The mobile electronic device according to claim 1 wherein
    said reference potential section comprises a sharp end section t formed to be sharp so as to project toward the outer edge region in which said through-hole of said partition section is formed.

7. The mobile electronic device according to claim 1 comprising:
    an antenna, wherein
    said first electronic component is a terminal connected to a transmission line through which high frequency waves signals, which are received or transmitted via said antenna, are transmitted.

8. The mobile electronic device according to claim 1 wherein
    a third electronic component is mounted on said circuit board, and wherein said reference potential section is a shield case shielding said third electronic component electronically.

9. The mobile electronic device according to claim 1 wherein
said through-hole penetrates the region facing said first electronic component, specifically the side of said partition section on which said first electronic component is located and the region facing said reference potential section, specifically the side on which said reference potential section is located.

* * * * *